United States Patent [19]

Young et al.

[11] 4,079,025

[45] Mar. 14, 1978

[54] COPOLYMERIZED STARCH COMPOSITION

[75] Inventors: Austin Harry Young; Frank Verbanac, both of Decatur, Ill.

[73] Assignee: A. E. Staley Manufacturing Company, Decatur, Ill.

[21] Appl. No.: 680,549

[22] Filed: Apr. 27, 1976

[51] Int. Cl.$^2$ ................................................ C08L 3/00
[52] U.S. Cl. ......................... 260/17.4 GC; 260/17.3; 260/17.4 ST; 260/17.4 UC; 536/50; 536/111
[58] Field of Search ........ 260/17.3, 17.4 GC, 17.4 ST, 260/17.4 UC; 536/50, 111

[56] References Cited

U.S. PATENT DOCUMENTS

| 2,668,156 | 2/1954 | Caldwell et al. | 260/17.4 |
|---|---|---|---|
| 2,928,827 | 3/1960 | Paschall | 536/50 |
| 3,033,852 | 5/1962 | Paschall | 536/50 |
| 3,135,738 | 6/1964 | Cushing | 536/50 |

FOREIGN PATENT DOCUMENTS

| 879,849 | 10/1961 | United Kingdom | 536/50 |
|---|---|---|---|
| 1,413,301 | 11/1975 | United Kingdom | 536/50 |

*Primary Examiner*—Edward M. Woodberry
*Attorney, Agent, or Firm*—M. Paul Hendrickson; Charles J. Meyerson

[57] ABSTRACT

Preformed, homogeneous, non-linear starch copolymerizate articles may be prepared by copolymerizing a preformed, homogeneous mixture of water, ethylenically unsaturated starch and ethylenically unsaturated monomers to provide a labyrinth of copolymerized starch chains interconnected with each other by the copolymerized monomeric units. The invention is particularly suitable for preparing high-binder, aqueous coating compositions which may be applied to a variety of substrates and subsequently copolymerized with polymerization initiating systems. Improved water- and detergent-resistance may be obtained by incorporating film-forming additives, cross-linking reagents or polyunsaturated compounds into the copolymerizable starch composition.

47 Claims, No Drawings

COPOLYMERIZED STARCH COMPOSITION

BACKGROUND OF THE INVENTION

Modified and unmodified starch products are extensively used for a variety of non-food and industrial applications. They have, traditionally, been used to size or finish textiles and papers, as adhesives (e.g., corrugated and laminated paper boards, remoistening gums, wallpapers, etc.), flocculants, binders (e.g., foundry core binders), fabric printing aides, thickeners and many other divergent non-food and industrial applications.

In the coated and shaped article manufacture, the trade presently relies upon synthetic polymeric materials which are primarily produced from petrochemical raw materials. Petrochemicals are a depletable natural resource. Within recent years, world-wide demand for petroleum-based products has adversely affected the cost and availability of synthetic polymers. Starches are readily available and replenishable with each crop year. Potential starch product usage would substantially increase, if it were possible to alter or correct certain inherent defects which have heretofore rendered starch products unsuitable for coating and/or shaped article applications.

Starches are inherently unstable against physical, chemical, bacterial and enzymatic degradation. Starches vary in amylopectin and amylose content. Waxy starches consist essentially of amylopectin with only trace amounts of amylose. Corn starch and other conventional starches such as tapioca, potato, wheat typically contain 16–24% amylose (dry solids weight basis) with the balance thereof being amylopectin. Amylose fractions are comprised almost exclusively of amylose while certain high amylose hybrid corn starches have an amylose content of about 40–70%.

Both high and low amylose starches have been used to coat substrates. The low amylose starches usually disperse readily into aqueous systems to provide an acceptable coating vehicle. Unfortunately low amylose starch coatings are prone to swell and readily disperse in water. In contrast, the high amylose starch coatings are typically insensitive towards water and possess adequate structural strength. Unfortunately, high amylose starches cannot be effectively converted into a uniform starch paste and directly utilized under ambient conditions to coat substrates. Both the high amylose starch and the low amylose starch coating techniques typically involve physical manipulation of starch molecules without altering or modifying the inherent starch compositional defects.

In U.S. Pat. No. 3,696,072 by G. A. Reynolds et al. there is disclosed hydrophobic, diethylenically unsaturated hydroxyl or amine containing polymers. By dispersing these diethylenically unsaturated polymers into organic solvent systems along with certain photoinitiators, ultraviolet curable coatings may be obtained. U.S. Pat. No. 3,936,428 by Rosenkranz et al. similarly report hydrophobic, photopolymerizable, N-methylol polyol polymeric compositions.

Numerous starch polymerizates have been reported. Caldwell et al. in U.S. Pat. No. 2,668,156 discloses that certain water-dispersible, ethylenically unsaturated starches will undergo homopolymerization in the presence of polymerization initiators. These starch homopolymerizates reportedly have reduced water-dispersibility properties and are useful for many conventional starch applications such as adhesives, sizing agents for textiles and papers, etc. The Caldwell et al. polymerizable starch system apparently produces a uniform homopolymerizate. Apparently a substantial portion of the starch ethylenic unsaturation either remains unpolymerized or undesirably intrapolymerized since the homopolymerization thereof becomes difficult at starch ethylenic unsaturation D.S. levels of 0.07 or higher.

Graft starch copolymers are also known (e.g., see U.S. Pat. Nos. 3,061,471, 3,061,472 and 3,095,391). Brockway et al. disclose granular starch polymethacrylate grafts by polymerizing granular starches in the presence of methyl methacrylate monomers, activators and initiators to provide a non-water-dispersible starch product (e.g., see Journal of Polymer Science, Part A, Vol 1, pages 1025–1039, 1963). Similarly, grafting by copolymerizing styrene and allyl starches (e.g., see Makromol Vol. 18–19, page 322, 1956), butadiene, styrene and acrylontrile (e.g., see Canadian Pat. No. 549,110 by Borunsky), acrylonitrile, acrylamide and acrylic acid (e.g., see C. A. Wilham et al. Polymerization Studies with Allyl Starch, Journal of Applied Polymer Science, Vol. 7, pages 1403–1410, - 1963) have been reported. The grafted non-starch polymer chains become an integral and unextractable part of the composite starch polymerizate and increases its hydrophobicity.

At one time allyl starches appeared potentially useful as starchbased coatings (e.g., see J. P. Radley, Starch and Its Derivatives, 4th Ed., 1968). Unfortunately, the allyl starch coating systems are plagued with difficulties such as non-homgeneity, brittleness, inflexibility, poor water-resistance and limited solubility in organo solvent systems (e.g., see Wilham et al. article cited above).

The art has long sought a polymerizable starch composition suitable for use as a protective coating and which will produce a starch polymerizate having improved resistance towards physical, chemical, bacteriological and enzymatic degradation. A water-dispersible and copolymerizable starch composition which could be applied to a substrate via an aqueous vehicle and thereafter copolymerized to a starch coating possessing excellent tensile strength and elongation, flexibility, impact and dynamic peel strength, water-and detergent-resistant properties would fulfill a long-felt need.

OBJECTS

It is an object of this invention to provide a water-dispersible, starch-based composition which will copolymerize to form a flexible, homogeneous starch copolymerizate.

A further object of this invention is to provide an aqueous coating composition which can be readily applied to a substrate and converted in situ to a flexible starch-based coating.

Another object is to provide a copolymerizable aqueous coating vehicle which contains a high-starch concentration at a low viscosity.

An additional object is to provide an improved method for using starch-based products in the manufacture of coated and solid objects.

A still further object is to provide a copolymerizable starch system which may be suitably combined with a variety of cross-linking or curing reagents and to obtain therefrom a starch polymerizate possessing the desired tensile strength, elongation, flexibility, dynamic peel strength, water-and detergent-resistance, and impact strength properties.

A further object is to provide a copolymerizable, water-based, starch system which is compatible with conventional coating and polymerization processes and equipment therefore.

A still further object is to provide a copolymerizable starch based system which will function as a petrochemical polymer replacement in the field of coated substrates and shaped articles manufacture.

THE INVENTION

According to the invention there is provided a copolymerizable, hydrophilic, film-forming, starch composition suitable for use in preparing articles coated with a starch copolymerizate, said starch composition comprising a homogeneous mixture of: (a) water; (b) water-dispersible ethylenic unsaturated starch comprised of starch chains and appendant ethylenic unsaturated groups uniformly distributed throughout the starch with said appendant groups being individual monomeric condensates contiguously attached to starch chains at a degree of substitution of at least 0.001; and (c) a water-dispersible, monoethylenic unsaturated monomer homogeneously dispersed throughout the starch composition in an amount sufficient to copolymerize with the ethylenic unsaturated appendant groups of the starch to provide a homogeneous copolymerizate of starch chains linked together by polymerized units of said monoethylenic unsaturated monomers and said appendant groups.

The ethylenically unsaturated monomers cross-link or interpolymerize with the ethylenic unsaturation of the water-dispersible starch chains to form a high molecular weight starch copolymerizate. The copolymerization of the ethylenically unsaturated starch with the water-dispersible monomer significantly alters the water-dispersibility properties of the starch copolymerizate. Whereas dried and unpolymerized coatings of the starch composition are readily water-dispersible, polymerized coatings thereof evince a significantly greater resistance towards redispersion into aqueous systems.

Prior to copolymerization with the ethylenic unsaturated starch, water-dispersible, ethylenically unsaturated monomers neither impart appreciable film-forming properties nor cohesiveness nor structural strength to shaped articles or coatings thereof. The ethylenically unsaturated monomers can serve, however, as wetting agents and/or plasticizers for articles or coatings which are prefabricated with the unpolymerized starch composition.

When copolymerized with the ethylenically unsaturated starches, the ethylenically unsaturated monomers become an integral and composite part of the starch copolymerizate and thus functionally contribute to the over-all compositional copolymerizate properties. The water-dispersible, ethylenically unsaturated monomers play a vital role in achieving a homogeneous starch copolymerizate. More complete copolymerization of the appendant ethylenically unsaturated starch groups is generally achieved by the ease with which the ethylenic unsaturated monomers copolymerize with the ethylenic unsaturated starch molecules. Premature gelling of the ethylenically unsaturated starch molecules (e.g., normally caused by intra- and intermolecular hydrogen bonding of starch molecules) as well as excessive homopolymerization of the ethylenic unsaturated starches are significantly reduced by interpolymerizing the ethylenic unsaturated starch with the ethylenic unsaturated monomers herein. Moreover, the interpolymerization of the ethylenic unsaturated monomer with the ethylenic unsaturated starch significantly enhances the copolymerizability of the starch component to provide a more homogeneous and more completely copolymerized starch product (i.e., a significantly high proportion of the starch ethylenic unsaturation becomes copolymerized). In addition, the copolymerized ethylenic unsaturated monomer system forms polymeric and internally plasticized linkages for the copolymerized starch composition. The internal plasticizing effect of the copolymerized ethylenically unsaturated monomer enhances the flexibility of the starch copolymerizate. In combination with cross-linking reagents and the ethylenically unsaturated starches, the ethylenic unsaturated monomers provide an effective means for achieving the desired tensile strength, elongation, flexibility, dynamic peel strength, impact strength, water-and detergent-resistance copolymerizate properties.

The water-dispersible, ethylenically unsaturated starches employed in this invention possess both hydrophilic and film-forming properties. The hydrophilic, film-forming attributes of the ethylenically unsaturated starch afford an effective means to convert the starch composition into the desired shaped or coated substrate form. The ethylenically unsaturated starches herein retain those desirable coating and shaping attributes of conventional starch-based aqueous systems. Accordingly, water may effectively be utilized as a vehicular means to convert the starch composition into the desired form. Due to the film-forming attributes of ethylenic unsaturated starch, prefabricated articles containing the unpolymerized starch composition generally possess sufficient structural strength and cohesiveness to retain the desired configuration until they are converted to the desired copolymerizate form. Cohesiveness, wettability and adhereability to substrates, coating or shaping ease, structural integrity and many other desirable coating and shaping attributes are fulfilled by the ethylenically unsaturated starch. The ethylenically unsaturated starches in combination with the water-dispersible ethylenically unsaturated monomers, however, provide an aqueous-based starch system which can be converted into a starch copolymerizate which overcomes many of the inherent deficiencies of conventional starch systems.

The ethylenically unsaturated starch molecules are comprised of starch chains and appendant ethylenically unsaturated groups. The starch chain is the polymeric or "backbone" chain to which appendant or ethylenically unsaturated groups are attached. Typically each appendant group will comprise a relatively small portion of the ethylenically unsaturated starch molecular weight (e.g., less than 1/20 of its total molecular weight).

The starch portion of the ethylenically unsaturated starches herein may be derived from a variety of starch sources, including cereal, leguminous, tuber starches, etc. Illustrative starch sources include tapioca, corn, high amylose starches (e.g., corn, pea, etc.), sweet potato, waxy maize, canna, arrowroot, wheat, sorghum, waxy sorghum, waxy rice, soya, rice, pea, amylose fractions, combinations thereof and the like. These starches retain their water-dispersibility unless modified or altered in such a manner so as to render the starch unpastable in water. Certain starches readily disperse into aqueous systems while others require more severe processing conditions in order to be dispersed in water. The amylose content of an ethylenically unsaturated starch affects the temperature at which the starch may be converted to a water-dispersible or starch paste form. The high amylose starches typically require elevated temperatures and pressures (e.g., extrusion, jet cooking, etc.), in order to be placed and maintained in uniform aqueous dispersion. In contrast, starches of a lower amylose content (e.g., 30% amylose or less) are more easily dispersed or pasted in water (e.g., 50°–70° C.). Prepasted or pregelled starches of an amylose content of less than 30% normally disperse into water at an ambient temperature (e.g., 23° C.).

For many coating and shaped article applications, it is advantageous to modify or alter the starch chain in order to impart more desirable functional attributes to the starch composition. These modified starches are particularly useful when it is desired to either improve upon the versatility of the ethylenically unsaturated starch in aqueous systems (e.g., during the coating or shaping thereof) or the copolymerizate properties. The ethylenically unsaturated starches herein may be extensively modified provided such modification does not adversely affect its polymerizability or dispersibility in aqueous systems. If desired, the ethylenically unsaturated starches may be conventionally derivatized or contain other known substituent groups (e.g., esters, ethers, cationic, anionic, non-ionic derivatives). Similarly, the ethylenically unsaturated starches may be converted to a pregelled or prepasted form. The ethylenically unsaturated starch may also be hydrolyzed (e.g., chemical or enzymatic hydrolysis of granular or non-granular ethylenically unsaturated starches), to further improve upon their water-dispersibility. Ethylenically unsaturated dextrins, maltodextrins and other low viscosity imparting ethylenically unsaturated hydrolyzates (e.g., D.E. 0.25–30) are particularly well suited for coating applications. These ethylenically unsaturated starch hydrolyzates provide a means for achieving a low viscosity aqueous coating system at a high starch solids concentration while improving upon the homogeneity of the dried coatings and coating copolymerizates thereof.

Hydrophobic ethylenically unsaturated starches may be used provided they are converted to a water-dispersible form. Conversion of hydrophobic ethylenically unsaturated starches to a water-dispersible form typically requires the presence of a dispersant which counteracts its hydrophobicity and imparts sufficient hydrophilic balance so that the ethylenic unsaturated starch will be uniformly dispersed into aqueous systems. Water-miscible organo dispersants in which the hydrophobic starch will disperse or dissolve such as alkanols (e.g., methyl, ethyl, isopropyl, or butylalcohol), polyhydric alcohols (e.g., glycerol, ethylene glycol), ethers, (e.g., methyl, ethyl, or propyl ethers, etc.), ketones (methyl ethyl ketone, ethyl ketone, etc.), as well as conventional anionic, non-ionic and cationic surface active agents or emulsifiers (e.g., see McCutcheon's Detergents and Emulsifiers, North American Edition - 1975) which are compatible with the aqueous-monomer phase, may be used to convert a hydrophobic starch to a water-dispersible form.

For most coating applications, it is advantageous to employ hydrophilic, ethylenically unsaturated starches which will uniformly disperse into water at temperatures above the starch gelation point without requiring water-miscible, organo-dispersants or surfactant systems for the dispersion thereof. Hydrophilic starches characterized as yielding a centrifugal starch residue of less than 25% (preferably less than 10%) upon immersion in water (one part ethylenically unsaturated starch/100 pbw water) for one hour at temperatures above their gelation point and centrifugation at $10^3$g's for 10 minutes are most suitably used for coating applications. Hydrophilic, ethylenically unsaturated starches which have pendant ethylenically unsaturated groups with polar moieties or substituents such as hydroxy, carboxy, amide, carbamyl, sulfoamino, sulfoamyl, imido, sulfoamino, thio, thiolamino, oxy, thiocarbonyl, sulfonyl, sulfinyl, carbonyl, sulfoamido, quaternary ammonium halides, the alkali or ammonium salts, that retain the desired hydrophilic properties to the ethylenically unsaturated starch are particularly useful.

The water-dispersible, ethylenically unsaturated starches herein may be prepared by a variety of starch derivatization processes. Illustrative derivatization processes producing appendant monoethylenically unsaturated groups include reacting alkali metal starch or hydroxyethylated starch salts with an alkyl propiolate to provide carboxylate vinyl starch ester (e.g., see U.S. Pat. No. 3,022,288 by L. A. Miller); ethylenically unsaturated starch esters or ethers obtained by reacting starch with ethylenically unsaturated, organic carboxylic anhydrides (e.g., methacrylic anhydride, etc.) or organic allyl halides (e.g., allyl bromides, allyl chloroformates, etc.) or epoxides (e.g., butadiene monoxides, etc.) such as disclosed in U.S. Pat. No. 2,668,156 by Caldwell et al.; etc. Typical monoethylenically unsaturated starches employed herein include starch esters of alpha, beta ethylenically unsaturated carboxylic acids (e.g., the acrylate, methacrylate, crotonate, citronate, itaconate starch esters as well as alkali salts and amides thereof, mixtures thereof and the like); allyl carbamate starch esters such as

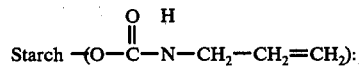

glycidyl methacrylate and glycidyl acrylate starch ethers (e.g., see U.S. Pat. No. 3,448,089); allyl starch ethers (e.g., allyl, iso-propenyl, etc.); the allyl alkyl starch ethers (e.g., ethyl, propyl, butyl, etc. starch ethers) and the allyl alkylene oxide starch ethers; allyloxyalkyl starch ethers (e.g., the allyl oxyethyl, oxypropyl and oxybutyl, etc. starch ethers); allyloxy hydroxyalkyl starches (e.g., 3-allyloxy-2-hydroxyl propyl starch, etc.); starch acrylamides, etc.; combinations thereof and the like.

In addition to the appendant group polarity, the steric configuration and ethylenic unsaturation positioning affects the polymerizability and starch copolymerizate characteristics of the ethylenic unsaturated starch. Ethylenically unsaturated starches with polar groups juxtapositional to the monoethylenic unsaturation that activate the reactivity of the double bond in the presence of free-radical, initiating systems perform more satisfactorily than those starches which do not contain such polar activating groupings. Illustrative juxtapositional activating polar groups include

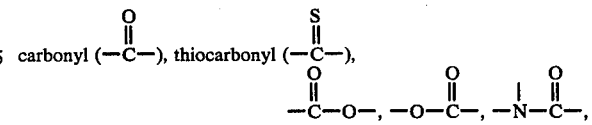

groups and the like. Ethylenic unsaturated starches which contain juxtapositional activating polar groups and terminal ethylenic unsaturates as represented by Formula I:

wherein Z represents a divalent organo-group linking the ethylenic unsaturates to the starch chain with a juxtapositional activating polar group as defined above, "$a$" represents a D.S. of at least 0.001 (preferably greater than about 0.01), R is a member selected from the group consisting of hydrogen and lower alkyl (preferably hydrogen or methyl) and starch represents a starch chain of D-glucose units, are particularly well suited as ethylenic unsaturated starches herein.

Excessively bulky, and long-chain, appendant groups adversely affect the copolymerizability of the ethylenic unsaturated starch. The ethylenically unsaturated starches herein will generally be comprised of appendant groups which individually have a molecular weight of less than 500 with those having an appendant molecular weight of greater than 50 but less than 300 (preferably from about 75 to about 150 M.W.) being most typical. Although the degree of ethylenic starch unsaturation may vary considerably (e.g., D.S. 0.001 to about 2.0 or higher), more complete starch interpolymerization (as opposed to starch molecular homopolymerization) and greater copolymerizate homogeneity are accomplished with starches having an ethylenic unsaturation substitution of less than 1.0 and advantageously those which have a D.S. 0.5 or less. Ethylenic unsaturated starches wherein "$a$" represents a D.S. ranging from about 0.02 to about 0.3 and preferably from about 0.05 to about 0.2 D.S. are particularly effective in achieving a homogeneous starch copolymerizate product.

In the preferred embodiments of this invention, the water-dispersible starch is a starch acrylamide represented by the structural formula II:

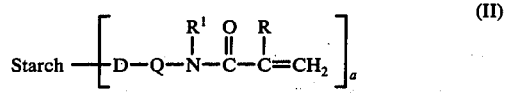

wherein starch represents a starch chain, $R^1$ is a member selected from the group consisting of hydrogen and a mono-organo group joined directly to the nitrogen atom by a monovalent bond, R represents a member selected from the group consisting of hydrogen and mono-organo group linked to an alpha carbon atom of the ethylenically unsaturated group of the acrylamide moiety by a monovalent linkage, Q represents an organo group which divalently joins the D group with the acrylamide group; D is a member selected from the group consisting of sulfur and oxygen linking said Q group to the starch chain and "$a$" represents the number of acrylamide substituents per anhydroglucose unit of said starch molecule (frequently referred to in the art as degree of substitution or D.S.).

In Formula II, Q may be any divalent organo group which joins the acrylamide radical to the starch chain (e.g., linked to D and acrylamide nitrogen atoms via carbon linkages). The starch oxygen or sulfur atom and acrylamide nitrogen atom may be directly linked together by a single carbon atom or an organo group comprised of a plurality of carbon atoms with the starch D and

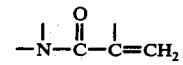

groups of the acrylamide starch being divalently linked by different Q carbon atoms. The —Q— group may be comprised of substituted or unsubstituted, straight or branched aliphatic groups (e.g., alkylene), a substituted or unsubstituted arylene group (e.g., naphthalene, phenylene, etc.) as well as divalent organo groups which contain carbon to non-carbon atom linkages (e.g., organo ethers and thioethers, sulfonyl, N-methylene substituted secondary and tertiary amines (such as a —CH$_2$—N(H)—Q— radical). The Q group linking chain may contain carbonyl, carbonyl-dioxy, thiocarbonyl, etc. groups as well as monovalent substituents such as hydroxy, halo, (e.g., Br., F, Cl and I), alkyl, aryl, hydroxyalkyl, hydroxyaryl, alkoxy, aryloxy, carboxyalkyl, carboxyaryl, amine substituents, combinations thereof and the like. Advantageously the divalent Q organo group contains less than 10 carbon atoms and preferably no more than 7 carbon atoms.

In Formula II, R and $R^1$ may be members selected from the group consisting of mono-organo and hydrogen substituents. The R and $R^1$ mono-organo group may contain an ester, ether, carboxylic, organo acid, alcohol, hydrocarbyl (e.g., alkyl, aryl, phenyl, etc.) groups as well as divalent organo groups containing non-carbon atom to carbon chain linkages (e.g., such as oxy, sulfonyl, thio, carbonyl groups, etc. as mentioned above with respect to Q). Advantageously R is either H or a substituted or unsubstituted mono-organo group containing less than 8 carbon atoms such as a lower alkyl or phenyl group. Illustrative substituted mono-organo groups are halo substituted alkyl and phenyl, alkoxy, aryl, phenoxy, phenol and alkanol and correspondingly thiols, alkanoic, phenoic, tolyl, benzoyl, carboxy, sulfoalkyl, sulfophenyl, combinations thereof and the like. In the preferred embodiments of this invention, R and $R^1$ are a member selected from the group consisting of either hydrogen or a 1–5 carbon alkyl (preferably methyl) and "$a$" has a value of at least 0.05.

The most preferred starch acrylamides are represented by the formula:

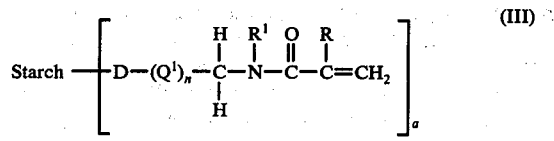

wherein D is a member as defined above (preferably oxy), $Q^1$ represents a divalent organo group such as Q is defined above, "$a$" represents the degree of substitution, R and $R^1$ are monovalent groups as defined herein and "$n$" is number of 0 or 1.

Illustrative starch acrylamides depicted in Formula III may be prepared by reacting N-methylol acrylamides with starch in the presence of an acid or acid generating catalyst and a polymerization inhibitor by the following etherification equation IV:

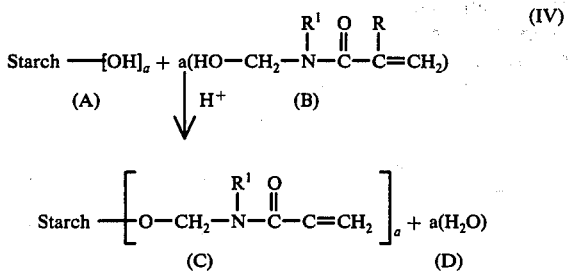

wherein —(OH)$_a$ of reactant A represents those reactive starch hydroxyl groups which are etherified with the N-methylol acrylamide reactant (B), R and R$^1$ are mono-organo or hydrogen groups such as defined herein, "a" in reactant B represents the moles of N-methylol acrylamide reacted with the starch to yield starch acrylamide (C) which contains an acrylamide derivatization level of "a", and H$^+$ represents an acid or acid generating etherifying catalyst. The above N-methylol acrylamide reaction may IV also be used to prepare a starch acrylamide reaction product (C) wherein Q as illustrated in Formula II contains an alkylene oxy or arylene oxy group by reacting the corresponding hydroxyaryl or hydroxyalkyl starch ethers (e.g., hydroxypropyl and hydroxyethyl starch ethers) with an N-methylol acrylamide wherein R$^1$ and R groups are as defined. Substituted acrylamides which contain a reactive N-methylol group linked to the acrylamide nitrogen atoms by intervening divalent Q organo groups and starches containing cationic and anionic or ionic acrylamide substituents may also be prepared by etherifying a starch with the appropriate N-methylol acrylamide (e.g., sodium-2-N-methylol acrylamido-2-methylpropanesulfonate, a N-methylol acrylamide quaternary ammonium halide such as 3(N-methylol acrylamido)-3-methyl butyl trimethyl ammonium chloride, etc.).

The R, R$^1$ and Q groups and the extent of derivatization therewith (i.e., "a") have a pronounced effect upon the character and functional attributes of the acrylamide reaction product. Representative R$^1$ substituents include hydrogen, N-arylol; the N-alkylamines and N-arylamines; N-organo cationic, anion or ionic substituents; such as N-methyl-; N-ethyl-; N-isopropyl-; N-n-butyl-; N-isobutyl-; N-n-dodecyl-; N-n-octadecyl-; N-cyclohexyl-; N-phenyl-; N-(2-hydroxy-1,1-dimethylpropyl)-; N-p-hydroxybenzyl-; N-(3-hydroxybutyl)-; N-(4-hydroxy-3,5-dimethylbenxyl)-; N-(3-hydroxy-1,1-dimethylbutyl)-; N-(2-hydroxy-1,1-dimethylethyl)-; N-(2-hydroxyethyl)-; N-(5-hydroxy-1-naphthyl)-; combinations thereof and the like.

Similar to R$^1$, the R group may therein bear monovalent organo or hydrogen substituents. Illustrative acrylamide reactants include N-methylol and N-methylthio acrylamides such as N-(hydroxymethyl) acrylamide; N-(hydroxymethyl)-N-[(1-hydroxymethyl) propyl] acrylamide; N-(hydroxymethyl)-2-alkyl acrylamides, (e.g., N-(hydroxymethyl)-2-methyl-heptyl) acrylamide; N-[(1-hydroxymethyl)-1-nonyl]-2-methyl acrylamide; N-(1-hydroxymethyl)-2-methyl acrylamide; N-(hydroxymethyl)-2-propyl acrylamide; etc.) N-(mercaptomethyl) acrylamide; N-methylol-N-isopropyl acrylamide; 3-N-(methylol acrylamido)-3-methyl butyl trimethyl ammonium chloride (cationic); sodium-2-N-methylol acrylamido-2-methyl propane sulfonate (anionic —CH$_2$:C(H)C(:O)N(CH$_2$OH)C[(CH$_3$)$_2$]CH$_2$SO$_3^-$Na$^+$), combinations thereof and the like.

Reaction IV may be suitably conducted in the presence of known acid or acid-generating catalysts (e.g., ammonium chloride or phosphate, monoammonium acid phosphate, zinc chloride, etc.), preferably at temperatures between about 70° C. to about 80° C. until the desired D.S. level is achieved. Conventional polymerization inhibitors (e.g., hydroquinone or derivatives thereof such as 2,5-di-t-butylquinone, etc.) are used to prevent homopolymerization of the starch acrylamide and acrylamide reactant.

The starch-acrylamides may be prepared via solution, slurry, dry, semi-dry or other appropriate condensation processes. To prepare a starch-acrylamide having a D.S. level of 0.03 or higher, it is desirable to uniformly disperse the acrylamide, acid or acid-generating catalyst and polymerization inhibitor throughout the starch reactant. Uniform dispersal of the N-methylol acrylamide reactant, catalyst and polymerization inhibitor throughout the starch may be effectively accomplished by initially forming a starch slurry or treating the starch with an absorbable dispersant media (e.g., water) in which the acrylamide, catalyst and polymerization inhibitor are soluble or placed in mobile form and thereafter imbibing or absorbing the dispersant and its solutes into the starch granules.

The water-dispersible, ethylenic unsaturated monomers are homogeneously dispersed throughout the starch composition. When copolymerized, the copolymerized monomers form polymeric connective linkages between juxtapositional starch chains to provide an interpolymerized starch composition. Homogeneous, ethylenic unsaturated monomer dispersion within the starch composition affords more complete copolymerization of the ethylenic unsaturated starch, inhibits premature congealing of the starch and avoids excessive starch molecular homopolymerization. This results in an interpolymerized starch and monomeric mass product which characteristically possesses uniformity and homogeneity as well as resistance towards redispersibility in water.

The ethylenic unsaturated monomers employed herein are generally characterized as being water-dispersible. Hydrophobic monomer systems may be utilized provided they are converted to a water-dispersible form. Water-miscible organo solvents or conventional emulsifiers (e.g., such as mentioned above with respect to the hydrophobic ethylenically unsaturated starches) may be used to convert the hydrophobic monomers to a water-dispersible form. Although monomers or monomer combinations which yield hard homopolymer of copolymer glass transition temperatures (T$_g$) in excess of 80° C., (e.g., acrylonitrile - T$_g$ about 95° C., styrene - T$_g$ 100° C., methyl methacrylate - T$_g$ 105° C., acrylic and methacrylic acid - T$_g$ 105° C.) may be employed, such hard monomers typically produce brittle and inflexible starch copolymerizates. The copolymerization of the ethylenically unsaturated starches solely with hard monomers normally produces a polymerizate similar to that which is obtained by homopolymerization of ethylenic unsaturated starches (e.g., brittle, reduced tensile and impact strength, reduced elongation properties).

By interpolymerizing the ethylenic unsaturated starches with water-dispersible, ethylenically unsaturated monomers or comonomer combinations which have an average polymer T$_g$ of less than about 80° C., the starch copolymerizations evince improved flexibility, impact strength and elongation properties. Hard monomers may be combined with other soft monomers so as to provide a copolymer $T_g$ of about 80° C. or less. Illustrative monomers copolymerizable with the ethylenic starch include the hydroxyalkyl esters (especially $C_2$-$C_4$ esters) of alpha beta-ethylenically unsaturated carboxylic acids (e.g., hydroxyethyl acrylate, 2-hydroxypropylacrylate, 4-hydroxybutyl-1-acrylate, hydroxyethyl methacrylate, 2,3 dihydroxypropyl methacrylate, di(2,3-hydroxypropyl) itaconate, ethyl hydroxyethyl maleate, di(hydroxypropyl) fumarate, hydroxyethyl crotonate, hydroxypropyl methacrylate, etc.); the sulfoalkyl esters of alpha, beta-ethylenically unsaturated acids such as sulfoethyl acrylate, sodium and ammonium sulfoethyl acrylates and methacrylates, 3-sulfo-2-hydroxypropyl-methacrylate, di(sulfo-ethyl) itaconate, ethyl sulfoethyl maleate, di(sulfoethyl) maleate, etc. (e.g., see U.S. Pat. Nos. 3,147,301; 3,033,833; 2,914,499; 2,923,734 and 3,024,221, etc.); the bisulfite esters of alpha, beta-ethylenically unsaturated acids such as bisulfite esters of ethylene glycol and/or triethylene monomethacrylates; ammonium and alkali metal salts of sulfato-alkene acrylates and methacrylates (e.g., see U.S. Pat. No. 3,839,393); the soft alkyl esters of alpha, beta-ethylenically unsaturated carboxylic acids(e.g., isobutyl-, 2-ethylhexyl-, butyl-, isobutyl-, lauryl-, isodecyl-, tridecyl-, steryl-, methacrylates and/or acrylates); N-substituted acrylamides and N-substituted methacrylamides (e.g., N-methyl-, N-ethyl-, N-propyl-, N-butyl-, N-n-dodecyl-, N-n-octadecyl-, N-cyclohexyl, N-phenyl, N-benzyl acrylamides and/or methacrylamide, etc.), vinyl acetate, combinations thereof and the like. Advantageously, the starch composition contains water-dispersible monomers or comonomer combinations which provide an average homopolymer or copolymer $T_g$ of less than 70° C. In the preferred embodiments of the invention, the starch composition contains a hydroxyalkyl ester of methacrylic and acrylic acid (most preferably those of a $T_g$ less than 60° C.) alone or in combination with other ethylenically unsaturated monomers so as to provide a copolymer $T_g$ of less than 70° C. (preferably less than 60° C.).

The amount of ethylenically unsaturated monomer present in the present starch composition can vary considerably provided it is present in an amount sufficient to interpolymerize with the appendant starch unsaturation. Comparatively, less than one equivalent of ethylenic unsaturated monomer per equivalent of starch unsaturation (e.g., such as a 1:2) will improve the starch copolymerizate properties over those obtained simply by homopolymerizing the ethylenically unsaturated starch. It is advantageous, however, to employ at least a 0.75 equivalent of ethylenic monomer unsaturation and preferably more than one equivalent of ethylenic monomer unsaturation for each equivalent of starch ethylenic unsaturation. As the ethylenic unsaturated monomer ratio increases above an equivalent ratio, more extensive homopolymerization of the monomer occurs between the copolymerized starch chains.

The water content of the starch composition can vary considerably. Water constitutes, however, the principal unpolymerizable starch composition liquid dispersant. In the starch composition, a multiplicity of functions are served by the water. The water functions as a vehicle for achieving homogeneity between the polymerizable reactants. It also serves as a medium for converting the hydrophilic film-forming starch solids into the desired configuration. The starch composition viscosity characteristics may be conveniently altered or controlled by the water concentration. Shaped articles fabricated at elevated pressures and temperatures (e.g., calendering, molding and extrusion processes), require a relatively small amount of water (e.g., about 5 parts water for each 100 parts by weight ethylenically unsaturated starch dry solids). For other applications, the water content (e.g., coating) may be 10,000 parts or more for each 100 parts by weight ethylenically unsaturated starch (d.s.b.).

The ethylenically unsaturated starch and ethylenically unsaturated monomer are provided within the starch composition in a water dispersible form. A convenient test for determining starch composition homogeneity is to uniformly admix the starch composition with water maintained at temperatures above the ethylenically unsaturated starch gelation point for one hour (e.g., at 75° C. for low-amylose starches and 175° C. for high-amylose starches) and at an ethylenically unsaturated starch dry solids concentration of 1% (including added surfactants or proportional amounts of water-miscible solvent in the case of the hydrophobic starches and/or monomers) and then centrifuge the heated admixture for 10 minutes at $10^3$ g's. Water-dispersible monomer and starch systems provide homogeneous aqueous dispersions as evidenced by a combined centrifuged residue and monomer supernatant of less than 25% (advantageously less than 10%) of the total ethylenically unsaturated starch and ethylenically unsaturated monomer admixture weight. Starch compositions which provide homogeneous dispersions substantially free of centrifuged residue and/or supernatant (e.g., less than 5% centrifugal starch residue) are particularly well suited for coating applications.

The most suitable proportions of water, ethylenically unsaturated monomer and starch in the starch composition depend primarily upon the water-dispersibility of the starch-monomer system and type of fabrication process which is used to prepare the copolymerizate. In fabrication processes such as molding, calendering, extrusion, etc.; starch compositions which contain a relatively high monomer and starch to water weight ratio (5:1 to 9:1) are generally useful. At the reduced water levels, incompatibility of the ethylenically unsaturated monomer and starch system can arise. Elevated fabricating temperatures and pressures may be used to improve upon the compatibility of this system. Likewise water-miscible solvents in which the ethylenically saturated monomers are soluble (e.g., such as glycerol) or emulsifying agents may be effectively utilized to enhance the water-dispersibility of the monomer-starch system into the aqueous phase.

In extrusion operations, the starch composition should contain a sufficient amount of water (with or without conventional starch plasticizers) to permit the conversion of the starch composition to a molten plasticized mass at the elevated extrusion temperatures (e.g., 80°-250° C.) and superatmospheric pressures, after which the molten mass is then extruded through a die orifice into an atmosphere of reduced pressure and temperature (e.g., maintained below the boiling point (B.P.) for void-free extrudates and above its B.P. for puffed extrudates such as disclosed in Canadian Pat. No. 829,207).

High-solids coating materials are desirable for most coating applications. In these applications, it is particularly advantageous to utilize a gelatinized or pregelatinized starch since they may be more effectively used in coating operations at low temperatures and generally provide more uniform starch coatings. Aqueous coating compositions containing the low viscosity ethylenically unsaturated starch hydrolyzates are especially useful when it it desired to coat substrates at dry binder weight levels of at least 40%. Sufficiently low starch paste viscosities at dry binder weight concentrations ranging from about 50% to about 75% (adapted for use in conventional high-speed coating operations) are achievable with these starch hydrolyzates. Improvements in drying ease and evaporation costs (normally associated with water removal from low coating solids aqueous vehicle systems) are obtainable through these high binder systems. The ethylenically unsaturated starch hydrolyzates function as conventional aqueous low viscosity starch paste systems with the added benefit of being convertible into a starch copolymerizate. Substrates may be uniformly wetted and coated therewith. The low viscosity ethylenically unsaturated starches also provide a homogeneous system for the coating operations (e.g., stable against syneresis, separation and viscosity change). The ethylenically unsaturated starch hydrolyzates may be prepared in a number of different ways. If desired, the starch chains may be depolymerized to the appropriate chain length before the ethylenically unsaturation derivatization, after the derivatization step but prior to their formulation into the starch composition or alternatively after their dispersion into the aqueous phase of the starch composition. Pregelled and prehydrolyzed ethylenically unsaturated starches are best suited for high coating binder systems because of the make-up ease and homogeneity thereof.

Depolymerization of the starch to the appropriate short chain length may be accomplished by conventional thinning techniques (e.g., acid or enzymatic thinning). Starch chains having a degree of polymerization comparable to that achieved by alpha amylase hydrolysis of starch to a D.E. ranging from about 0.25 to 32, advantageously from about 1 to about 20 and most preferably between about 2 to about 15 may be effectively used to coat substrates. The reduced starch chain length will not adversely affect starch coating permanency since the ethylenically unsaturated starch is copolymerized with the ethylenically unsaturated monomer to provide a high molecular weight starch copolymerizate.

In most coating applications, the water content is typically adjusted to a fluidity most suitable to coat the substrate. The starch coating composition viscosity may vary considerably and depends to a large extent upon the type of coating operation employed (e.g., from about 1 to about 40,000 cps or higher for extrusion coating). The proportions of water, monomer and ethylenically unsaturated starch weight ratios may likewise vary considerably (e.g., about 5 to about 10,000 parts by weight, i.e., pbw, water and about 1 to about 5,000 pbw monomer for each 100 pbw ethylenically unsaturated starch). In coating operations conducted under ambient temperatures, it is advantageous to utilize a homogeneous starch coating composition of viscosity greater than about 10 cps but less than 5,000 cps (most typically between about 20 cps to 1,000 cps) and containing from about 25 to about 800 pbw water and about 10 to about 2,000 pbw ethylenically unsaturated monomer for each 100 pbw ethylenically unsaturated starch. Water-miscible, organo solvents or surfactants are desirably incorporated into the coating composition for purposes of achieving homogeneity and a uniform monomer dispersion when the starch coating formulation contains a low amount of water and a high monomer concentration. Starch coating compositions which are adpated for use in high-speed coating operations are typically formulated at a viscosity ranging from about 100 cps to about 300 cps (with or without fugitive organo solvents or surfactants) at about 30 to about 500 pbw water and about 25 to about 1,000 pbw (preferably between about 50 to about 500 pbw) ethylenically unsaturated monomer for each 100 pbw ethylenically unsaturated starch. In formulations for high-speed coating operations, starch coating homogeneity is more easily achieved by using less than 3 weight parts ethylenically unsaturated monomer for each 2 weight parts of water and preferably at a weight ratio of less than one part monomer for each water part.

In the absence of a polymerization initiating system, the starch compositions are stable against interpolymerization when stored under ambient conditions. Because the copolymerization of the starch compositions may be induced by a plurality of polymerization initiating techniques, the starch compositions herein may be conveniently prefabricated into the desired configuration and then copolymerized via a conventional polymerization initiating system. The starch compositions will undergo copolymerization upon exposure to conventional irradiation processes which generate in situ polymerization initiators therein (e.g., electron-beam, X-ray, alpha-ray, gamma-ray, etc. initiation). Alternatively, free-radical catalysts or free-radical precursors may be uniformly incorporated into the starch composition which will then latently copolymerize upon exposure to appropriate initiating conditions (e.g., photochemical induction, ultra-violet, heating or microwave techniques, etc.).

Conventional free-radical polymerization initiators at levels sufficient to copolymerize the ethylenically unsaturated starch and monomer (e.g., about 0.2% to about 20% on a starch-monomer weight basis) which may be incorporated into the starch composition include the organic and inorganic peroxides (e.g., hydrogen peroxide, benzoyl peroxide, tertiary butyl hydroperoxide, diisopropyl benzene hydroperoxide, cumene hydroperoxide, caproyl peroxide, methyl ethyl ketone peroxide, etc.), oxidation-reduction initiator systems (ammonium, potassium or sodium persulfates or hydrogen peroxide with reducing agents such as sodium bisulfites, sulfites, sulfoxylate, thiosulfates, hydrazine, etc.); azo initiators (e.g., tertiary aliphatic azo compounds which undergo homolytic dissociation) such as azo di-isobutyonitrile, phenylazotriphenylmethane, 1,1'-azodicyclohexanecarbonitrile, 1,1'-dimethylazoethane; diazoamino compounds (e.g., 3,3-dimethyl-1-phenyltriazene and aryldiazo thioethers) and other free-radical generating catalysts such as certain aromatic ketones (e.g. benzoin methyl ether, benzophenone and its derivatives), chlorinated aromatics as well as other free-radical type of polymerization initiators. Free-radical initiator systems which require externally applied energy (e.g. thermally, photochemical, etc.) for free-radical generation may be used to provide a latently copolymerized system. Advantageously the free-radical polymerization initiators are uniformly dispersed throughout the aqueous phase of the starch composition at levels ranging from about 0.3% to about 10% (based on polymerizable starch and monomer dry weight).

Polymerization initiation via U.V. light sources (e.g., 200–430 nanometer, n.m., range, such as by carbon arc lamps, Zenon lamps, high pressure mercury lamps) is particularly useful in high-speed coating operations. If desired, conventional photosensitizers (e.g. triethanol amine, eosin, methylene blue, combinations thereof, etc.) which activate the polymerization catalysts by active energy transfer may be incorporated into the starch composition to facilitate the copolymerization initiation reaction. The ultra-violet polymerization initiating processes are generally suitable for coatings or films of a thickness of less than about 20 mils (preferably less than about 10 mils). Thicker starch polymerizate articles or films normally require deeper penetrating irradiation devices (e.g., X-ray, electron-beam, gamma generation, etc.) or thermal induction. The ultra-violet copolymerization process is particularly effective for high solids starch coating applications (e.g., about 55% to about 75% dry solids) because it simultaneously dries and copolymerizes the starch coating in a single step. Water-dispersible, non-fugitive free-radical initiating systems (e.g., catalysts which evaporate or do not leave catalytic residue in the copolymerizate) such as hydrogen peroxide are preferred.

The starch copolymerizates prepared in accordance with the present invention are characterized as comprising copolymerized units of an ethylenic unsaturated monomer wherein a plurality of ethylenically unsaturated groups of a starch chain are copolymerized with the water-dispersible, ethylenically unsaturated monomers to form a non-linear, labyrinth of copolymerized starch chains randomly interconnected to one another by interconnecting linkages represented by formula V:

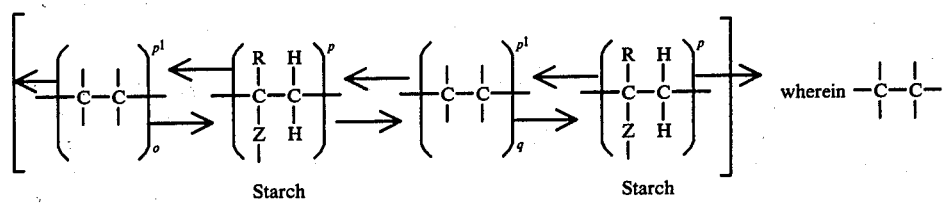

Starch                    Starch represents copolymerized, water-dispersible, ethylenic unsaturated monomer units, "$o$" and "$q$" respectively represent the number of recurring copolymerized monomeric units with both "$o$" and "$q$" having a value of at least one, Starch represents a starch chain having a plurality of appendant copolymerized ethylenically unsaturated groups, Z represents a divalent organo group linking the copolymerized ethylenically unsaturated group to the starch chain, R is a member selected from the group consisting of hydrogen and an organo group monovalently linked to the alpha carbon of the copolymerized ethylenically unsaturated starch group, "$p$" represents a plurality of appendant copolymerized ethylenically unsaturated groups linked to said starch chain and "$p^1$" represents a plurality of copolymerized monomer interpolymerized with the said appendant "$p$" starch groups. In the more limited aspects of this invention, the copolymerized water-dispersible ethylenically unsaturated monomers and water-dispersible ethylenically unsaturated starches have a composition as defined above. As the D.S. of the ethylenic unsaturated starch increases, the value of "$p$" will proportionally increase in value. Similarly by varying the relative proportions of ethylenically unsaturated starch and ethylenically unsaturated monomer, the number of copolymerized ethylenically unsaturated monomer between recurring copolymerized starch units may be increased or decreased. Thus by increasing the ratio of monomer to starch, the "$o$" and "$q$" values of polymerized saturated monomers in Formula V will correspondingly increase.

The starch copolymerizate represented by Formula V is a nonlinear, polydimensional copolymerizate product. Within the starch copolymerizate, any given copolymerized starch chain is randomly copolymerized through the monomeric polymer linkages to a plurality of adjacent starch chain molecules which may be similarly copolymerized to a host of different starch chains. Theoretically, a given copolymerized starch chain will have "$p$" units of ethylenical unsaturation which can copolymerize with an equal "$p$" value of different starch molecules via the copolymerized monomeric linkages.

Certain properties of the starch copolymerizate (e.g., reduced tack, solvent or detergent or water-resistance, wet- and dry-rub resistance, slip, hardness, etc.) may be improved by incorporating conventional filmforming additives and/or conventional cross-linking reagents and/or polyethylenically unsaturated substances into the starch composition.

Typical cross-linking reagents include those generally characterized as containing multifunctional reactive sites which will either react with the ethylenically unsaturated starch and/or ethylenically unsaturated monomers (e.g., ether, ester, amide type reactions) to form cross-linkages between the copolymerized starch molecules. Such cross-linking reagents typically form cross-linking groups by Zerewitinoff-active hydrogen type (e.g., hydroxyl, carboxyamido, amino, carboxyl, etc.) chemical reactions. Conventional etherification, esterification, primary and secondary amine condensation type of reactions are illustrative thereof. Illustrative cross-linking reagents which may be incorporated into the starch composition include the polycarboxylic acids and their corresponding anhydrides such as the alpha, beta-ethylenically unsaturated dicarboxylic acids and anhydrides thereof, (e.g., citric or adipic, succinic, fumaric, maleic, itaconic aids and their anhydrides), epichlorohydrins, amido and azirindinyl compounds, formaldehyde, hydroxy urea-formaldehyde, melamine-formaldehyde, diepoxides, (e.g., diglycidyl ethers), epihalohydrins (e.g. epichlorohydrins), phosphorous oxychloride combinations thereof and the like.

If employed, the cross-linking reagents are typically used in amounts sufficient to reduce the water-swelling (e.g., absorbency) or to improve upon the detergent-resistance properties of the starch copolymerizate. Measurable improvements in water and detergent resistance copolymerizate properties are generally achieved when these cross-linking reagents are present at levels ranging from about 1 to about 200 pbw for each 100 pbw ethylenically unsaturated starch. As the cross-linking reagent concentration increases above the 15 pbw level, the starch copolymerizates become more brittle. The flexible starch copolymerizates herein will typically comprise less than equal weights of starch and cross-linking agent with amounts ranging from about 5 to about 85 pbw (based on 100 pbw ethylenically unsaturated starch) and preferably at about 15 to about 75 pbw being best suited for producing flexible, water and detergent-resistant copolymerizates thereof.

Water-dispersible, non-starch, polyethylenically unsaturated compounds may be copolymerized with the ethylenically unsaturated starches to form the connective linkages between the labyrinth of interpolymerized starch molecules. Similar to the condensate-type, cross-linking reagents these polyethylenically unsaturated compounds may be used to improve upon the copolymerizate water and detergent-resistance. If desired, these polyethylenically unsaturated compounds may be used as a partial or complete replacement for the water-dispersible, monoethylenically unsaturated monomers disclosed herein. Diethylenically unsaturated compounds typically copolymerize into more flexible starch copolymerizates than the tri-, tetra- or pentaethylenic unsaturated compounds. Comparatively, the monalthylenically unsaturated monomers, however, typically produce a less rigid and more flexible starch copolymerizate than the polyethylenically unsaturated compounds.

The hydrophobic, polyunsaturated compounds should be solventized or emulsified as mentioned above with respect to the water-dispersible starch and monomer components. Polyunsaturated compounds which contan polar activating groups juxtapositional to the ethylenically unsaturated group are preferred. Illustrative polyethylenically unsaturated compounds include pentaerythritol triacrylate; trimethylpropane triacrylate; 1,6-hexanediol diacrylate; triethylene glycol diacrylate; trimethylol propane trimethacrylate; pentaerythritol acrylate; ethylene glycol dimethacrylate, conjugated and non-conjugated dienes (isoprene, butadiene, etc.) cyclic- and heterocyclicdienes (e.g., bicycloheptadiene), etc., combinations thereof and the like. The polyunsaturated compounds may be used as the sole water-dispersible ethylenically unsaturated monomer system and may (if desired) constitute the principal copolymerizable ingredient of the starch composition. If employed, the polyethylenically unsaturated monomers are most advantageously used in minor amounts in conjunction with major amounts of a water-dispersible monoethylenically unsaturated monomer.

The starch compositions may be formulated with a broad range of other natural and synthetic polymeric film-forming additives. If present in the starch composition, these additives are typically admixed and uniformly dispersed throughout the starch composition. The additives may be used to complement the starch copolymerizate by imparting certain physical and chemical properties of the additive to the starch composition. Due to the interpolymerization of the ethylenic unsaturated starch and monomer system, the film-forming additives become integrate into the starch copolymerizate labyrnith structure. Natural polymers and resins such as rubber, fossil, copal, copal damar, shellac, rosin and cellulose, etc., mixtures thereof and the like are illustrative additives. Synthetic resins and synthetic polymeric materials such as rosin derivatives, cumarone resins and derivatives thereof, alkyd and polyester resins, certain cellulose derivatives (e.g., carboxymethyl cellulose, hydroxyethylcellulose, cellulose acetates, etc.), ethylenically unsaturated emulsion polymerizates (e.g., acrylamide, acrylic polymers such as methacrylic and acrylic acids and the acrylate esters thereof; acrylonitrile; styrene; maleate, phthalate and fumarate esters; alkenes such as polyethylene and polypropylene; vinyl acetate; vinyl halides such as vinyl chloride; vinylidene halide such as vinylidene chloride; combinations thereof and the like); glycol esters of rosin, the ethylene, triethylene and diethylene as well as hydrogenated esters thereof; ethylene and diethylene glycol esters of polymerized rosin; maleic modified ester gums; pentaerythritol esters of rosin, synthetic and natural waxes such as carnauba wax, paraffin waxes, microcrystalline waxes, Fischer-Tropsch waxes, polyethylene waxes and the like; methylated urea-formaldehyde resins, methylated-melamine resins, combinations thereof and the like, are illustrative synthetic film-formers which may be suitably incorporated into the starch compositions.

The water-dispersible film-forming additives are typically used to improve upon such copolymerizate properties such as dry- and wet-rub, scuff resistance, slip, water-resistance, detergent-resistance, improved strength, elongation, antiblocking, etc. In general, the film-forming additives may range from 0 to about 300% of the total ethylenically unsaturated starch and water-dispersible ethylenically unsaturated monomer weight. Most starch composition formulations which contain these additives, will contain less than 100 pbw combined (100 pbw starch basis) with levels of about 5 to about 50 pbw for each 100 pbw ethylenically unsaturated starch being most typical.

Water-miscible, organic solvents such as alcohols, (e.g., methyl, ethyl, isopropyl, N-propyl, butyl alcohols), organo ester solvents such as methyl acetate, isopropyl acetate, N-propyl acetate, methyl ethyl ketone, methyl butyl ketone, dioxane, glycol ethers, etc. may (as with the hydrophilic starch and monomer systems) be effectively used to convert hydrophobic film-forming additives and/or cross-linking reagents to a water-dispersible form. Similarly, polymeric emulsifiers or surface active agents such as mentioned above may be effectively employed to place these hydrophobic additives and cross-linking reagents in a water-dispersible form. Techniques conventionally employed in the preparation of aqueous based printing inks (e.g., see Belgian Pat. Nos. 813,505 and 814,445), aqueous floor polish systems (e.g., see U.S. Pat. Nos. 3,457,208; 2,901,453; 2,971,934 and 3,328,325; etc.) may be effectively utilized to uniformly and homogeneously disperse hydrophobic additives and cross-linking reagents into the starch composition aqueous phase. Conventional polymeric emulsions (e.g., see U.S. Pat. Nos. 3,825,514; 3,850,726; 3,447,940 and particularly column 4, line 51 - column 5, line 46; 3,329,638; 3,296,176; 3,296,175; 3,914,495; 3,383,346; 3,041,208; 3,291,769; 3,266,921; 3,223,658; 2,308,474; 3,269,967; 3,133,032; 3,293,201; etc.) may be used as film-forming additives in the present starch compositions.

Depending upon the desired application, the starch composition may also be formulated to include conventional polymeric additives such as fungistats, bactericides, dyes, pigments, blocking agents, buffers, antifoamers, tackifiers, dispersants, driers, extenders, foaming and defoaming reagents, plasticizers, sequestering agents, softeners, thickeners, levelers, antioxidants, combinations thereof and the like. Such additives may be used in conventional amounts and are preferably uniformly dispersed throughout the starch composition.

The present starch compositions are especially adapted for use in the manufacture of decorative articles, plates and films which may be prepared by photosensitive processes. Plates, films, substrates or supports (e.g., metal sheets, films or foils such as copper, aluminum, zinc, etc., glass, cellulose, polyester, polyvinyl acetate, polystyrene, polyethylene terephthalate, etc.) may suitably be coated with the adherent, photosensitive, hydrophilic starch compositions. If desired, the starch coatings may contain conventional light-reflecting photosensitive compositions (e.g., prepared on the support and adherent thereto, or on the surface thereof or as a layer or stratum adsorptive of actinic light so as to minimize reflectances from the combined support of incident actinic light). Plates, films or other supportive members wholly or partially coated with the polymerizable starch composition are useful in photography, photochemical reproductions, lithography and intaglio printing. Such uses include offset printing, silk screen printing, duplicating pads, manifold stencil sheeting coatings, lithographic plates, relief plates and gravure plates. These coatings and films are also applicable to the printed circuit industry, as etching and electroplating resists, defining integrated circuits, chemical machining and nameplate processes (e.g., metals removed by etching photographic resist images), etc. In such applications, the photosensitive composition or coatings may be converted to a starch copolymerizate by exposure of the desired image or design to U.V. light (or other suitable irradiation or thermal induction) to produce the desired image or patterns. The shielded areas (e.g., photographic negative or positive images or other appropriate shielding means) remain unpolymerized and thus retain the water-dispersible, film-forming character of the unpolymerized composition whereas the unshielded areas are converted to a starch copolymerizate. The shielded and unshielded portion may then be easily separated from one another by conventional means (e.g., water washing, etc.) to provide the desired pattern or image.

The following examples are merely illustrative and should not be construed as limiting the scope of the invention.

EXAMPLE I

Two low viscosity, starch acrylamide products respectively of a D.S. 0.075 and 0.15 were prepared employing the following proportions of reagents (parts by weight basis):

115 STA-TAPE 100 Starch[1] (100 parts by weight dry starch basis)
12.5 N-methylolacrylamide (as 60% aqueous soln.)
3.0 ammonium chloride (acid catalyst)
0.0063 hydroquinone (polymerization inhibitor)
115 water

[1] - STA-TAPE 100 — manufactured by the A. E. Staley Manufacturing Company — A low viscosity, acid-thinned, granular waxy maize starch (100% amylopectin) typically characterized as having a Brookfield viscosity of about 500 CPS (#2 spindle, 20 rpm, 150° C. at a dry solids of 40-45%) and a D.E. of less than 1%.

The aforementioned reagents were uniformly blended to a stiff dough consistency by slowly adding the starch to a solution containing the N-methylolacrylamide, acid catalyst, hydroquinone and water reagents (αpH 4.6). The stiff dough blend was then spread onto a stainless steel tray (12 ⅜ × 16 ⅜ inches) and allowed to air-dry at ambient temperature (23° C.) to a semi-dried product of 24.6% water content (total weight basis). The resultant unreacted product was then converted to a starch acrylamide by placing 22.5 parts by weight of the unreacted semi-dry blend into a 125° C. forced air oven for 45 minutes followed by immediately cooling of the resultant reaction product to an ambient temperature for purposes of effectively terminating the condensation reaction. The resultant crude starch acrylamide reaction product was converted to a refined starch acrylamide by slurrying in water, filtering and washing the filtered residue with water followed by a methanol wash. The resultant refined starch acrylamide was air-dried to 5% moisture level under ambient conditions. The acrylamide D.S. of the resultant starch acrylamide was 0.15 (as determined by nitrogen analysis — 1.2% starch acrylamide nitrogen content). The 0.075 starch acrylamide (0.67%N) was prepared in the same manner excepting that the 125° C. oven dry reaction was conducted for a shorter period of time so as to provide a 0.075 D.S. starch acrylamide.

A photopolymerizable starch composition was made by placing into solution 19 pbw 0.075 D.S. starch acrylamide in 52 pbw water and then adding thereto (at 23° C.) 3 pbw hydrogen peroxide (3 pbw $H_2O_2$ + 7 pbw $H_2O$) and 19 pbw hydroxyethylacrylate (HOEA). The starch composition (which contained 38% by weight binder ingredients with a 25° C. Gardner viscosity of B-C)was then wet-cast upon glass plates to a film thickness of 1.5 mil. The resultant unpolymerized films were than exposed to varying time intervals of ultra-violet irradiation to initiate the copolymerization thereof via a Hanovia 679A 100 watt/inch lamp equipped with an Alzak aluminum reflector laterally positioned 1.5 inches above a variable speed conveyor preset at a speed of 20 ft./min.. The results of this test are as follows:

| Irradiation passes | Exposure Time (sec.) | Film Characteristics Immediately after Irradiation | 2 hours after Irradiation (at 23% & R.H.) |
|---|---|---|---|
| 0 | 0 | fluid | white & brittle |
| 1 | 0.2 | gel | translucent, tough and flexible |
| 6 | 1.1 | fluid & solid | translucent, tough and flexible |

The white, chalky and brittle film resulting from the non-irradiated (i.e., unpolymerized) starch composition (with nominal utility) is atypical of films which are prepared from low amylose starches. By copolymerizing the 0.075 D.S. acrylamido starch with the HOEA, the resultant starch copolymerizates were characterized as translucent, flexible, tough and useful starch copolymerizate films. The test was repeated with the 0.15 D.S. starch acrylamide with similar results being observed.

The total amount of HOEA starch water-solubles and HOEA starch water-insolubles was determined for each of the unpolymerized residues and copolymerized films by immersing a 0.2 gram sample thereof in 1.8 ml. of distilled water at 75° C. for sixty minutes with the weight percent of starch/HOEA water-solubles being ascertained by the weight differential occurring as a result of the water immersion test. The non-irradiated, white, frangible HOEA/0.075 D.S. starch and the HOEA/0.15 D.S. starch dried residues yielded water-soluble fractions respectively of 78.23 and 85.41%. The water-insoluble HOEA/starch residue obtained from the 0.2 second irradiated films for the 0.075 D.S. and 0.15 D.S. acrylamidomethyl starches was respectively 88.7% and 15.29% while the 1.1 second irradiated films thereof respectively yielded water-insoluble starch films residues of 97.31% and 98.65%.

In this example, the water-solubility of the acrylamidomethyl starch (before copolymerization) may be increased by conducting the Example I drying reaction at 75° C. for a longer period of time. The starch copolymerizate thereof, however, will possess a similar 97%+ water-insoluble starch copolymerizate character.

The weight swelling ratios of HOEA/starch copolymerizate water-insolubles for each of the aforementioned films were determined by the equation:

$$WSR = \frac{I}{O-S}$$

wherein WSR equals the weight swelling ratio, "I" is weight of film water-insolubles, "O" is the original (i.e., non-immersed) film weight and "S" is the weight of starch film water-solubles. The calculated WSR value for each of the non-irradiated, 0.2 second irradiated and 1.1 second irradiated films for the 0.075 D.S. and 0.15 films was respectively 10.29 and 22.61; 8.12 and 6.77; and 6.03 and 4.88.

Upon the basis of the aforementioned comparative tests, it is evident that the copolymerization of the starch acrylamide and HOEA easily produces copolymerizates having a water-insoluble starch content in excess of 75% with the more fully irradiated films thereof (i.e., more completely copolymerized) having a water-insoluble starch residue in excess of 97% by weight. Also, the total water-soluble starch copolymerizate fractions and water-swelling ratio decreases as the degree of starch ethylenic unsaturation and/or the level of irradiation increases. Notwithstanding a relatively low degree of ethylenic unsaturation, both the 0.075 D.S. and 0.15 D.S. starch acrylamides could be effectively converted into a product having completely different properties from the starting raw materials.

EXAMPLE II

A(3-allyloxy-2-hydroxy)-propyl starch

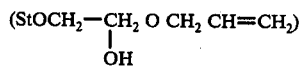

was prepared by suspending 100g of dry STA-TAPE 100[2] in 200 ml. water, maintained under a nitrogen blanket, to which there was added 5g of calcium hydroxide. The system was equilibrated for 1 hour at room temperature and the temperature was increased from 45° C. to 50° C. without pasting of the starch. Fourteen and two-tenths grams (14.2g) of allyl glycidyl ether was then added. The starch-allyl glycidyl ether reaction was then conducted for 22 hours at 50° C. During the reaction thereof, the resultant mixture developed into a thick paste consistency which was indicative of starch pasting. The reaction media was then neutralized to pH 4.5 with 3N hydrochloric acid. With vigorous agitation, 1.6 liters ethanol was added dropwise to the reaction mixture for purposes of forming an amorphous precipitate. The resultant (3-allyloxy-2-hydroxy)-propyl starch precipitate was filtered upon a M-porosity glass filter with periodic agitation to facilitate the filtration thereof. The partially dehydrated, solid reaction was dehydrated by grinding the filtered precipitate with 200 ml. of absolute ethanol, air-drying for 22 hours at 23° C. followed by oven-drying for 3 hours at 60° C. to yield 111.1g of (3-allyloxy-2-hydroxy)-propyl starch product. The dried product was analyzed for allyloxyhydroxypropyl groups by the Wijs solution method for ethylenic unsaturation and found to contain 7.97% (3-allyloxy-2-hydroxy)-propyl groups (dry weight basis) with a D.S. of 0.12.

2 — see Footnote 1

Employing 19.4 parts (weight basis) of the (3-allyloxy-2-hydroxy)-propyl starch, 50.7 parts distilled water, 19.4 parts hydroxyethylacrylate, 3.1 parts hydrogen peroxide dissolved in 6.6 parts of distilled water, a copolymerizable starch composition was prepared. The starch was initially admixed with the distilled water and heated at 100° C. for 15 minutes with additional water being subsequently added to compensate for water-loss arising because of evaporation thereof. The resultant starch solution was then cooled to room temperature with the hydroxyethylacrylate then being admixed thereto followed by the peroxide catalyst addition. The resultant aqueous starch composition was cast upon glass plates to a 1.5 mil thickness with a Gardner doctor blade. The fluid starch composition coating were then exposed to 1.1 second of ultra-violet irradiation (per Example I). Upon completion of the 1.1 second irradiation, the irradiated films had converted to a tacky and essentially non-flowable starch gel. The films were than air-dried for two hours at ambient temperatures. The irradiated films were characterized as solid, translucent, non-tacky starch copolymerizates. The irradiated coating samples were submitted to the Example I immersion test and found to contain only 6.53% water-soluble starch. Irradiated control starch composition coatings were also formulated without adding hydrogen peroxide (i.e., polymerization catalysts). These unpolymerized coatings yielded 83.4 weight percent water-soluble starch.

A similar starch coating composition, containing twice the amount of hydrogen peroxide, was coated upon West Virginia raw paper stock with a No. 10 wire wound rod and then exposed to 0.8 seconds ultra-violet irradiation. This provided a tack-free starch copolymerizate coating with excellent air-barrier resistance as ascertained by the Gurley-Hill S-P-S tester. Neither the uncoated paper stock nor the unpolymerized starch coated paper would possess adequate air-barrier properties.

EXAMPLE III

This example illustrates the effect that varying levels of conventional cross-linking reagents will have upon the water-resistance and detergent-resistance of a 0.075 D.S. acrylamidomethyl starch. The water resistance test comprised placing a drop of water upon the coating and allowing it to remain for 30 minutes at 23° C. and a relative humidity (R.H.) of 50%. In the detergent-resistance test, a drop of a conventional household detergent ("Tide" at 1% aqueous detergent solution level) was permitted to remain upon the coating for 60 minutes (at 23° C. and 50% R.H.). A copolymerized starch coating under either test which separated, swelled or dissolved from the substrate was considered a failure. Starch copolymerizate coatings which remained intact passed the test. Several phosphate chemically treated galvanized steel panels (BONDERITE 37) were coated with a No. 10 wire wound rod and irradiated with ultra-violet light for 1.1 second using starch coating compositions which contained different levels of cross-linking reagents. The starch coating composition formulations and results of this Example are reported in the following Table.

TABLE F
INCREASING WATER RESISTANCE WITH METHYLATED UF & MF RESINS

| Wt. % Crosslinker (dry substance basis) | 0 | 13 | 25 | 13 | |
|---|---|---|---|---|---|
| Acrylamidomethyl Starch | 20 | 17 | 16 | 17 | |
| Distilled Water | 50 | 46 | 43 | 46 | |
| HOEA | 20 | 17 | 16 | 17 | |
| Hydrogen Peroxide (30% $H_2O_2$) | 10 | 9 | 9 | 9 | |
| Methylated Urea-Formaldehyde Resin[a] | — | 5 | 11 | — | |
| Hexamethoxymethyl melamine[b] | — | — | — | 5 | |
| p-Toluene Sulfonic Acid (20% in isopropanol) | — | 6 | 5 | 6 | |
| Solids, Wt. % | 40 | 40 | 44 | 40 | |
| Gardner viscosity, 25° C., CPS | 65–85 | 65–85 | 125–140 | 85–100 | |
| | | | | 25° C. | 177° C. |
| Water Resistance | Failed | Passed | Passed | Failed | Passed |
| Detergent Resistance | Failed | Failed | Passed | | |

[a]BEETLE 65, American Cyanamid Company
[b]CYMEL 301, American Cyanamid Company

The water-resistant and detergent-resistant tests were conducted 18 hours after irradiation and storage under ambient conditions. As illustrated by the above data, the inclusion of methylated urea formaldehyde or hexamethoxymethyl melamine resins at coating levels in excess of 10% effectively improves upon the water-resistant properties of the starch copolymerizate coatings. The methylated urea formaldehyde resin may be cured under ambient conditions to water-resistant and detergent-resistant films or coatings.

EXAMPLE IV

A 0.07 D.S. acrylamidomethyl starch prepared in accordance with Example I methodology was hydrolyzed to a low viscosity acrylamidomethyl starch. The acrylamidomethyl starch was hydrolyzed by initially thoroughly pasting an aqueous 0.07 D.S. acrylamidomethyl starch slurry (39% dry weight starch solids) at 95° C., cooling the paste to 60° C., adding an enzymatic activating amount of calcium ion (1.8M calcium hydroxide), neutralizing the paste to pH 6.45 with dilute hydrochloric acid and then hydrolyzing the 0.07 D.S. starch for 8 minutes with 0.25 units of alpha amylase per gram of acrylamidomethyl starch (Ban 120 — see U.S. Pat. No. 3,783,100 by Larson et al.). The hydrolyzed acrylamidomethyl starch was recovered therefrom and freeze-dried (250 cps Brookfield viscosity, 23° C. at 37.4% solids, 20 rpm and #4 spindle).

The freeze-dried 0.07 acrylamidomethyl starch was then formulated (at 23° C.) into a high-solids (62% dry binder additive) photosensitive starch coating composition which contained 31 pbw 0.075 D.S. starch, 31 pbw HOEA, 10 pbw of a 30% aqueous hydrogen peroxide solution and 28 pbw distilled water and had a Gardner viscosity of 22–32 cps at 25° C. Employing a No. 10 wire wound rod, coatings of the starch composition were applied to BONDERITE 37, aluminum polymethacrylate (Plexiglass), polyester, (Celanar) and glass substrates. Each of the coated substrates was then irradiated with ultraviolet light for 1.1 second per the procedure of Example I. To a 1 × ¾ inch area of each coated substrate, a translucent adhesive tape (Scotch tape) was firmly applied 22 hours after the irradiation to each of the coatings and manually, rapidly torn upwardly therefrom to determine whether or not any of the irradiated coating would be removed from the substrate by this test. It was observed that all of the irradiated coatings remained intact excepting polymethacrylate coated substrate. The non-irradiated coatings were brittle with extensive adhesion failure and unacceptable for testing.

EXAMPLE V

An ambient copolymerizable 0.075 D.S. acrylamidomethyl starch composition was prepared in a manner similar to Example III. The composition consisted of 19 pbw acrylamidomethyl starch, 61 pbw water, 19 pbw HOEA and a polymerization redox initiator system of 0.14% ammonium persulfate, 0.06% sodium bisulfite and 0.02% ferrous sulfate (% based on total starch composition weight). The starch composition exothermically copolymerized to a gel within 30 seconds after the redox initiation addition. It is noted that by varying either the monomer to starch ratio, the copolymerizable starch and monomer concentrations or amount of polymerization redox initiator, the rate and/or temperature at which the starch composition will copolymerize may be controlled.

EXAMPLE VI

A pigmented paper coating composition was prepared employing the (3-allyloxy-2-hydroxy)-propyl starch of Example II. The starch composition contained 4 pbw of the ethylenic unsaturated starch, 35 pbw water, 5 pbw HOEA, 52 pbw #2 predispersed paper coating clay HT and 5 pbw 30% aqueous hydrogen peroxide. Paper stock was coated with the paper coating composition (via #10 wire wound rod), and irradiated for 1.1 seconds as in Example I.

EXAMPLE VII

The tensile strength, elongation (%), flexibility, hardness and reverse impact resistance properties of several starch coatings were studied. The tensile and elongation measurements (elongation to break) were determined with a Tinius-Olsen Universal tester (set at 12 pounds full scale, 2 inches grip separation, ¼ inch sample width, 2 inches per minute drive-load and recorder chart speed at 2 inches per minutes) on films which were obtained by irradiating coatings stripped from a glass substrate (1.5 mil doctor blade). The reverse impact resistance and flexibility tests were made upon "BONDERITE 37" steel panel coatings (coated with a No. 10 wire-wound rod) as determined with a Gardner light-duty, variable impact tester and Gardner conical mandrel (one eighth inch). The coatings were irradiated with ultra-violet light in accordance with the methodology of Example I. The coating formulations and determined tensile and elongation tests results are as follows:

| Film | Thickness (mils) | U.V. Exposure (Seconds) | Tensile Strength (psi) | Elongation (%) |
|---|---|---|---|---|
| Amylopectin | 4.6 | 0 | 6570 | 4 |
| (3-alloxy-2-hydroxy) propyl starch-(AHPS) | 1.6 | 1 | 1500 | 3.5 |
| 50% AHPS/50% HOEA | 1.6 | 0.17 | 2550 | 5.0 |
|  | 3 | 1 | 2088 | 19 |
| 50% AHPS/50% hydroxypropyl acrylate | 2.8 | 1 | 2850 | 30 |
| 0.09 D.S. half ester of maleic anhydride waxy maize corn starch (MAS) | 2.2 | 1 | 4850 | 3.5 |
| 0.09 D.S. MAS 50%/50% HOEA | 3.5 | 1 | 2210 | 5 |

Irradiated coatings for both the 0.075 and 0.15 D.S. acrylamidomethyl starch copolymerized with an equivalent hydroxyethyl acrylate weight were also made. These acrylamidomethyl starch coatings adhered too tenaciously to the glass substrate to permit tensile and elongation determinations to be made. As evidenced by the excellent reverse impact strength and conical mandrel values, these acrylamidomethyl starches had excellent tensil strength elongation (about 30%) properties.

This example illustrates that the elongation properties of the starch copolymerizates may be improved when the ethylenically unsaturated starches are copolymerized with hydroxyalkyl acrylate monomers. Improvement in the tensile strength of AHPS coatings are also achieved by its copolymerization with the hydroxyalkyl acrylate monomers. The reverse impact resistances for the 0.075 D.S. acrylamidomethyl starch/HOEA coatings was in excess of 90-inch-pounds and had a pencil hardness of H. The reverse impact strengths for the amylopectin, and AHPS, MAS and acrylamidomethyl starch homopolymerizate coatings, i.e. without the hydroxyalkyl acrylate comonomer, are very low (i.e. very brittle coatings).

Reverse impact resistance and conical elongation tests were also conducted upon irradiated coatings containing varying levels of methylated urea-formaldehyde resin in combination with equivalent weights of copolymerized hydroxyacrylate monomer and acrylamido starch per the methodology of Example III. It was observed that the coating reverse impact strength decreased by a factor of about 4-inch-pounds for each 1% incremental increase in methylated urea-formaldehyde resin (based on the total resin-HOEA-acrylamidomethyl starch weight, e.g. inch-pound values of 90+ at 0%, 71 at 10% and 30 at 20%). The elongation characteristics of the coatings also decreases as the cross-linking reagent level increases. The decreased impact strength and elongation properties arise because the starch copolymerizate is more rigidly and extensively cross-linked. The copolymerizates of all the ethylenically unsaturated starches with the hydroxyalkyl acrylate comonomers significantly improved the flexibility of all the starch copolymerizates thereof.

Since many embodiments of this invention may be made and since many changes may be made in the embodiments described, the foregoing is interpreted as illustrative and the invention is defined by the claims appended hereafter.

What is claimed is:

1. A copolymerizable, hydrophilic, film-forming, starch composition suitable for use in preparing articles which are coated with a starch copolymerizate, said starch composition comprising a homogeneous mixture of (a) water; (b) water-dispersible ethylenically unsaturated starch comprised of starch chains and appendant ethylenically unsaturated groups uniformly distributed throughout the starch with said appendant groups being individual monomeric condensates contiguously attached to starch chains at a degree of substitution of at least 0.001; and (c) water-dispersible, monoethylenically unsaturated monomer homogeneously dispersed throughout the starch composition in an amount sufficient to copolymerize with the ethylenically unsaturated appendant groups of the starch to provide a homogeneous copolymerizate of starch chains linked together by polymerized units of said monoethylenically unsaturated monomer and said appendant groups.

2. The starch composition according to claim 1 wherein the water-dispersible, ethylenically unsaturated starch comprises a starch represented by the formula:

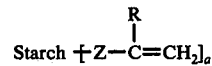

wherein Z represents a divalent organo group linking the terminal ethylenically unsaturated group to the starch chain, starch represents a starch chain, "a" represents a D.S. of greater than 0.01 and "R" is a member selected from the group consisting of hydrogen and a mono-organic radical.

3. The starch composition according to claim 2 wherein "a" has a value corresponding to a D.S. ranging from about 0.02 to less than 0.5, "R" is a member selected from the group consisting of hydrogen and a lower alkyl group, the appendant group has a molecular weight greater than 50 and less than 300, the starch chain comprises a starch hydrolyzate and the starch composition contains at least 5 to about 800 parts by weight water for each 100 parts by weight ethylenically unsaturated starch.

4. The starch composition according to claim 1 wherein the composition comprises from about 30 to about 500 parts by weight water and from about 10 to about 200 parts by weight ethylenically unsaturated monomer for each 100 parts by weight ethylenically unsaturated starch.

5. The composition according to claim 4 wherein the ethylenically unsaturated monomer provide a polymer having an average glass transition temperature of less than 80° C. when said monomer is polymerized.

6. The composition according to claim 5 wherein the water-dispersible ethylenically unsaturated monomer comprises at least one member selected from the group consisting of hydroxyalkyl acrylate and hydroxyalkyl methacrylate.

7. The composition according to claim 6 wherein the ethylenically unsaturated starch comprises a starch having an ethylenic unsaturation D.S. ranging from about 0.05 to about 0.2.

8. The composition according to claim 1 wherein the ethylenically unsaturated starch is characterized as containing monoethylenically unsaturated appendant groups having polar groups juxtapositioned to the monoethylenically unsaturation which activates the copolymerizability of the ethylenic unsaturated group of said appendant group when said starch composition is exposed to free-radical polymerization catalysis.

9. The composition according to claim 8 wherein the composition comprises an ethylenically unsaturated starch having an appendant group D.S. ranging from about 0.02 to about 0.3, water ranging from about 30 to about 500 parts by weight, ethylenically unsaturated monomer ranging from about 50 to about 500 parts by weight, and ethylenically unsaturated monomer characterized as providing a polymer having an average polymer glass transition temperature of less than 80° C. when said monomer is polymerized.

10. The composition according to claim 9 wherein the starch composition comprises an ethylenically unsaturated starch hydrolyzate which has an amylose content of less than 30% by weight, the starch composition has a Brookfield viscosity ranging from about 20 cps to about 500 cps and the starch composition contains free-radical polymerization initiator in an amount sufficient to permit the copolymerization of said ethylenically unsaturated starch with said ethylenically unsaturated monomer when said starch composition is exposed to polymerization initiating means to cause the generation of free-radicals within said starch composition.

11. The starch composition according to claim 1 wherein the ethylenically unsaturated starch consists essentially of a starch acrylamide represented by the formula:

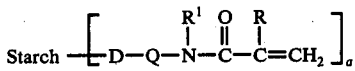

wherein starch represents a starch chain, $R^1$ is a member selected from the group consisting of hydrogen and a mono-organo group joined directly to the nitrogen atom by a monovalent bond, R represents a member selected from the group consisting of hydrogen and mono-organo group linked to the alpha carbon atom of the ethylenically unsaturated group of the acrylamide moiety by a monovalent linkage, Q represents an organo group which divalently joins the D group with the acrylamide group; D is a member selected from the group consisting of sulfur and oxygen linking said Q group to the starch chain and "a" represents the number of acrylamide substituents per anhydroglucose unit of said starch molecule.

12. The starch composition according to claim 11 wherein "a" represents a D.S. ranging from about 0.01 to about 0.5, "R" and "$R^1$" represent a member selected from the group consisting of hydrogen and a lower alkyl group and the individual appendant groups are characterized as having a molecular weight greater than 50 but less than 300.

13. The starch composition according to claim 11 wherein the composition contains from about 25 to about 800 parts by weight water and from about 50 to about 500 parts by weight ethylenically unsaturated monomer for each 100 parts by weight unsaturated starch and D is an oxy group.

14. The composition according to claim 13 wherein the ethylenically unsaturated monomer provides a polymer having an average polymer glass transition temperature of less than 70° C. when said monomer is polymerized, and the composition contains latent polymerization initiator in an amount sufficient to copolymerize said ethylenically unsaturated starch with said ethylenically unsaturated monomer when said starch composition is exposed to polymerization initiating means to induce the copolymerization of said composition.

15. The composition according to claim 11 wherein the D.S. of starch acrylamide ranges from about 0.05 to about 0.3, the starch acrylamide comprises a starch acrylamide hydrolyzate and the starch composition contains a sufficient amount of hydrogen peroxide to copolymerize said ethylenically unsaturated monomer with said starch acrylamide when said starch composition is subjected to polymerization initiating means which is sufficient to cause said hydrogen peroxide to form free-radicals within said starch composition.

16. The starch composition according to claim 15 wherein D comprises an oxy group, the starch composition contains from about 25 to about 800 parts by weight water and about 50 to about 500 parts by weight monoethylenically unsaturated monomer for each 100 parts by weight starch acrylamide, and monoethylenically unsaturated monomer characterized as providing a polymer having an average polymer glass transition temperature of less than 70° C. when said monomer is polymerized.

17. The starch composition according to claim 16 wherein $R_1$ is hydrogen, R is a member selected from the group consisting of hydrogen and methyl group and Q is a methylene group.

18. The starch composition according to claim 17 wherein the starch acrylamide consists essentially of a starch acrylamide hydrolyzate and the starch composition has a viscosity ranging from about 20 cps to about 40,000 cps.

19. The starch composition according to claim 18 wherein the ethylenically unsaturated monomer comprise hydroxyalkyl acrylate.

20. The composition according to claim 17 wherein the starch composition contains at least one effective member selected from the group consisting of film-forming additive, cross-linking reagent and polyethylenically unsaturated compound with said member being present in said starch composition in an amount sufficient to improve the water-resistance of copolymerizates prepared from said starch composition.

21. The starch composition according to claim 20 wherein the amount of said member is sufficient to impart improved detergent-resistance properties to copolymerizates which are prepared from said starch composition.

22. The starch composition according to claim 1 wherein the water-resistance of films formed from said copolymerization of said starch composition is improved by incorporating into the starch composition at least one effective member selected from the group consisting of film-forming additive, cross-linking reagent and polyethylenically unsaturated compound with said member being present in said starch composition in an amount sufficient to impart improved water-resistance to copolymerizates of said starch composition.

23. The starch composition according to claim 22 wherein the amount of said member is sufficient to impart improved detergent-resistance properties to copolymerizates which are prepared from said starch composition.

24. A method for preparing a starch copolymerizate article which comprises the steps of:
A. Preforming a starch composition into a desired configuration with said starch composition comprising a homogeneous mixture of:
 (a) water;
 (b) water-dispersible, ethylenically unsaturated starch comprised of starch chains and appendant ethylenically unsaturated groups uniformly distributed throughout the starch with said appendant groups being individual monomeric condensates contiguously attached to starch chains at a degree of substitution of at least 0.001;
 (c) water-dispersible, monoethylenically unsaturated monomer homogeneously dispersed throughout the starch composition in an amount sufficient to copolymerize with the ethylenically unsaturated appendant groups of the starch to provide a homogeneous copolymerizate of starch chains linked together by polymerized units of said monoethylenically unsaturated monomer and said appendant groups;
B. Copolymerizing the preformed starch composition article by exposing the preformed starch composition to polymerization initiating means sufficient to cause said ethylenically unsaturated starch to copolymerize with said ethylenically unsaturated monomer;
and thereby provide a preformed starch copolymerizate article thereof.

25. The method according to claim 24 wherein the appendant ethylenic unsaturation D.S. is less than 0.5, and the starch composition contains 100 parts by weight ethylenically unsaturated starch, at least 10 to about 10,000 parts by weight water and from about 10 to about 2000 parts by weight ethylenically unsaturated monomer.

26. The method according to claim 25 wherein the water-dispersible, ethylenically unsaturated starch comprises a starch represented by the formula:

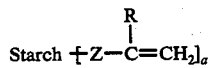

wherein Z represents a divalent organo group linking the terminal ethylenically unsaturated group to the starch chain, starch represents a starch chain, "a" represents a D.S. of greater than 0.05 and "R" is a member selected from the group consisting of hydrogen and a mono-organic group.

27. The method according to claim 26 wherein the ethylenically unsaturated monomer provide a polymer having an average glass transition temperature of less than 70° C. when said monomer is polymerized, and the starch composition contains latent polymerization initiator in an about sufficient to copolymerize said ethylenically unsaturated starch with said ethylenically unsaturated monomer when said starch composition is exposed to polymerization initiating means to cause the copolymerization of said preformed starch composition article.

28. The method according to claim 27 wherein the starch composition has a Brookfield viscosity ranging from about 20 cps to about 5000 cps, a water content ranging from 25 to less than 50% by weight of the total starch composition weight and the starch composition is preformed into a starch composition article by coating a substrate with said starch composition.

29. The method according to claim 25 wherein the preformed starch composition contains at least one effective member selected from the group consisting of film-forming additive, a cross-linking reagent and polyethylenically unsaturated compound with said member being present in said preformed starch composition in an amount sufficient to improve the water-resistance properties of said starch copolymerizate article.

30. The method according to claim 24 wherein the ethylenically unsaturated starch consists essentially of a starch acrylamide represented by the formula:

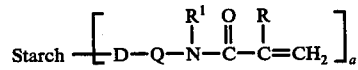

wherein starch represents a starch chain, $R^1$ is a member selected from the group consisting of hydrogen and a mono-organo group joined directly to the nitrogen atom by a monovalent bond, R represents a member selected from the group consisting of hydrogen and mono-organo group linked to the alpha carbon atom of the ethylenically unsaturated group of the acrylamide moiety by a monovalent linkage, Q represents an organo group which divalently joins the D group with the acrylamide group; D is a member selected from the group consisting of sulfur and oxygen linking said Q group to the starch chain and "a" represents the number of acrylamide substituents per anhydroglucose unit of starch molecule.

31. The method according to claim 30 wherein "a" represents a D.S. ranging from about 0.01 to about 0.3, "R" and "$R^1$" represent a member selected from the group consisting of hydrogen, and lower alkyl group and the individual appendant groups are characterized as having a molecular weight greater than 50 but less than 300.

32. The method according to claim 31 wherein the preformed starch composition contains from about 50 to about 500 parts by weight ethylenically unsaturated monomer for each 100 parts by weight unsaturated starch, and D is an oxy group.

33. The method according to claim 32 wherein the ethylenically unsaturated monomer comprise hydroxyalkyl acrylate and Q is a methylene group.

34. The method according to claim 33 wherein the preformed starch composition article contains hydrogen peroxide in an amount sufficient to permit the starch composition to copolymerize and the copolymerization thereof is initiated by subjecting the preformed composition to polymerization initiating means sufficient to cause said hydrogen peroxide to generate free-radicals and thereby copolymerize said starch composition.

35. The method according to claim 34 wherein the starch acrylamide consists essentially of starch acrylamide hydrolyzate and the viscosity of said starch composition ranges from about 20 cps to about 300 cps.

36. The method according to claim 32 wherein the starch composition contains a cross-linking reagent in an amount sufficient to improve the detergent-resistance properties to said copolymerizate.

37. A preformed, non-linear, homogeneous starch copolymerizate article, said starch copolymerizate article comprising the copolymerization product of:
(a) water-dispersible, ethylenically unsaturated starch comprised of starch chains and appendant ethylenically unsaturated groups uniformly distributed throughout the starch with said appendant groups being individual monomeric condensates contiguously attached to starch chains at a degree of substitution of at least 0.001; and
(b) water-dispersible, monoethylenically unsaturated monomer homogeneously dispersed throughout the starch in an amount sufficient to copolymerize with the ethylenically unsaturated appendant groups of the starch,
with said copolymerizate article being further characterized as being comprised of a labyrinth of starch chains wherein a plurality of the copolymerized appendant ethylenically unsaturated groups of a starch chain molecule are randomly inter-connected to a plurality of copolymerized ethylenically unsaturated groups of starch chain molecules by intervening linkages of said copolymerized monoethylenically unsaturated monomer.

38. The starch copolymerizate article according to claim 37 wherein the D.S. of the appendant group ranges from about 0.02 to about 0.3, and the monomer provide a polymer having an average polymer glass transition temperature of less than 80° C. when said monomer is polymerized.

39. The starch copolymerizate article according to claim 38 wherein the article contains at least one member selected from the group consisting of film-forming additive, cross-linking reagent and copolymerized non-starch, polyunsaturated compound in an amount sufficient to improve the detergent-resistance of said copolymerizate article.

40. The starch copolymerizate article according to claim 37 wherein the ethylenically unsaturated starch contains starch moieties represented by the formula:

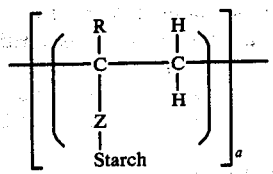

wherein Z represents a divalent organo grouping linking the copolymerized ethylenically unsaturated moiety to the starch chain, R is an organo group monovalently linked to the alpha carbon atom of the copolymerized ethylenically unsaturated group and "$a$" represents a D.S. ranging from 0.01 to about 0.5.

41. The starch copolymerizate article according to claim 40 wherein the copolymerized ethylenically unsaturated monomer comprise hydroxyalkyl ester of an alpha, beta-ethylenically unsaturated carboxylic acid.

42. The article according to claim 41 wherein the article contains from about 50 to about 500 parts by weight copolymerized ethylenically unsaturated monomer for each 100 parts by weight copolymerized ethylenically unsaturated starch.

43. The starch compolymerizate article according to claim 42 wherein the copolymerizate is cross-linked with condensation cross-linking reagents in an amount of at least 10% by weight of the total copolymerized ethylenically unsaturated starch and ethylenically unsaturated monomer weight.

44. The starch copolymerizate according to claim 40 wherein Z comprises:

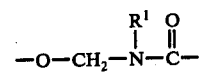

moiety with $R^1$ comprising a monovalent organo group or hydrogen.

45. The starch copolymerizate article according to claim 44 wherein $R^1$ is a member selected from the group consisting of hydrogen and lower alkyl group of 1 to 5 carbon atoms, and the ethylenically unsaturated monomer comprises hydroxyalkyl acrylate having an alkyl group containing from 2 to 4 carbon atoms inclusive.

46. The starch copolymerizate article according to claim 45 wherein the copolymerizate article comprises from about 100 to about 500 parts by weight copolymerized ethylenically unsaturated monomer for each 100 parts by weight copolymerized ethylenically unsaturated starch and "$a$" represents a D.S. ranging from about 0.02 to about 0.3.

47. The article according to claim 46 wherein the copolymerizate is cross-linked with condensation cross-linking reagent in an amount sufficient to impart detergent-resistance properties to said starch copolymerizate article.

* * * * *

UNITED STATES PATENT AND TRADEMARK OFFICE
CERTIFICATE OF CORRECTION

PATENT NO. : 4,079,025
DATED : Mar. 14, 1978
INVENTOR(S) : Austin Harry Young and Frank Verbanac It is certified that error appears in the above-identified patent and that said Letters Patent are hereby corrected as shown below:

Column 2, line 19; for "acrylontrile" read ---acrylonitrile---
Column 2, line 29; for "starchbased" read ---starch-based---
Column 3, line 6; for "starchbased" read ---starch-based---
Column 9, line 22; for "reaction may IV" read ---reaction IV may---
Column 9, line 60; for "2-methyl-heptyl)" read ---2-(methyl-heptyl)---
Column 11, line 1; for "copolymerizations evince" read ---copolymerizates evince---
Column 14, line 4; for "adpated" read ---adapted---
Column 16, line 19; for "filmforming" read ---film-forming---
Column 17, line 22; for "monalthylenically" read ---monoethylenically---
Column 17, line 30; for "contan" read ---contain---
Column 17, line 58; for "integrate" read ---integrated---
Column 19, line 62; for "(apH 4.6)." read ---(@ pH 4.6).---
Column 24, line 55; for "werestudied" read ---were studied---
Column 27, line 9; for "monoethylenically" read ---monoethylenic---
Column 27, line 10; for "ethylenic" read ---ethylenically---
Column 29, line 65; for "about" read ---amount---

UNITED STATES PATENT AND TRADEMARK OFFICE
CERTIFICATE OF CORRECTION

PATENT NO. : 4,079,025
DATED : Mar. 14, 1978
INVENTOR(S) : Austin Harry Young and Frank Verbanac It is certified that error appears in the above—identified patent and that said Letters Patent are hereby corrected as shown below:

Column 19, footnote 1, line 4; for "150°C." read ---150°F.---

*Signed and Sealed this*

*Twenty-ninth* Day of *May 1979*

[SEAL]

Attest:

RUTH C. MASON
*Attesting Officer*

DONALD W. BANNER
*Commissioner of Patents and Trademarks*